United States Patent [19]

Birthwright

[11] 3,927,387

[45] Dec. 16, 1975

[54] CONTROL APPARATUS

[76] Inventor: Robert Geoffrey Birthwright, 61, Normanton Ave., Wimbledon Park, London, SW19, England

[22] Filed: Nov. 20, 1973

[21] Appl. No.: 417,599

[30] Foreign Application Priority Data

July 17, 1973 United Kingdom ............... 34059/73

[52] U.S. Cl. ................ 338/317; 317/101; 338/197; 338/320

[51] Int. Cl.[2] ......................................... H01H 37/36

[58] Field of Search ........... 338/128, 228, 319, 320, 338/317, 197; 200/296; 248/27; 317/101 CC, 101 R, 101 C

[56] References Cited

UNITED STATES PATENTS

| | | | |
|---|---|---|---|
| 2,740,027 | 3/1956 | Budd et al. | 338/197 |
| 2,791,666 | 5/1957 | Daily et al. | 200/296 |
| 2,812,407 | 11/1957 | Budd | 200/296 |
| 3,271,627 | 9/1966 | McDougal | 317/112 |

*Primary Examiner*—David Smith, Jr.
*Attorney, Agent, or Firm*—Cushman, Darby & Cushman

[57] ABSTRACT

Control apparatus and a method of constructing control apparatus such as a microphone mixing desk, which includes a plurality of control devices, for example switches or potentiometers having a body and an arm, extending from the body, which carries at its free end means for operating the control device. The control devices are arranged on a control panel and electrically connected to a circuit board but, whereas such devices are normally mounted with the body between the panel and the circuit board and with the arm extending through a hole in the panel, they are according to this invention mounted with the body on one side, preferably the solder side, of the circuit board and with the arm extending through both the circuit board and the panel.

2 Claims, 4 Drawing Figures

CONTROL APPARATUS

The invention concerns improvements in and relating to control apparatus and to a method of constructing control apparatus. In particular the invention concerns control apparatus which includes a plurality of control devices operable by means arranged on a control panel of the apparatus.

In this specification the phrase "control device" refers to an electrical control device having a body from which extends an arm bearing, at its free end, means for operating the control device. Examples of such control devices are electrical switches and potentiometers or variable resistors and these are normally mounted behind a control panel with the arm protruding through a hole in the control panel and, in most cases, secured by a nut screwed onto the free end of the arm so as to grip the control panel between the nut and the body of the device.

In the case of a flick-switch, the means for operating the switch constitutes a lever mounted in the end of the arm and, in the case of a rotary switch or a potentiometer, a knob is mounted on the end of a shaft extending out from the end of the arm, the shaft being turnable continuously or in discrete steps to adjust the device.

A typical potentiometer has tags mounted on the body by which a connection to a printed circuit board is effected. One common way of effecting a connection is to mount the potentiometer on the control panel in the manner described above and to locate the printed circuit parallel to the control panel with the solder side (viz. the side to which soldered connections are made) facing away from the control panel. If the tags are sufficiently long, they can be bent down and passed through the printed circuit board and soldered to a terminal on the solder side. In many cases, however, the tags are not sufficiently long or the printed circuit board is, for constructional reasons, widely spaced from the control panel, and this necessitates the connection of lengths of wire between the tags and pins passing through the board and connected to the terminals on the solder side. This operation is time consuming and costly; furthermore, equipment constructed in this way tends to be bulky. Another and more important disadvantage is that the front panel must be removed if one potentiometer is to be replaced and to do this involves removing the control knob and securing nut of each potentiometer. Further, movement of the control panel is limited by the length of the wire connected to the tags and can stress or even dislodge the soldered joints.

It is an object of this invention to obviate these disadvantages.

According to one aspect of this invention control apparatus comprises a control panel, an electrical circuit board adjacent the panel, a plurality of control devices as hereinbefore defined, each electrically connected to a circuit on the circuit board and secured in position with the body on one side of the circuit board and the arm passing through both the circuit board and the control panel.

According to another aspect of this invention a method of constructing control apparatus comprising a control panel, an electrical circuit board and a plurality of control devices as herein defined, each for electrical connection to a circuit on the circuit board, comprises the steps of disposing the control panel adjacent the circuit board, securing each control device in position with its body on one side of the circuit board and the member passing through holes in both circuit board and the control panel.

The control panel may be attached to the circuit board and, in a preferred form, the control panel is smaller in area than the circuit board and is attached to an upper part thereof and the circuit board includes tracks by which the control devices are connected to circuit components mounted on a lower part of the said one side of the board.

An embodiment of the invention will now be described by way of example with reference to the accompanying drawings, of which:

Figure 1:
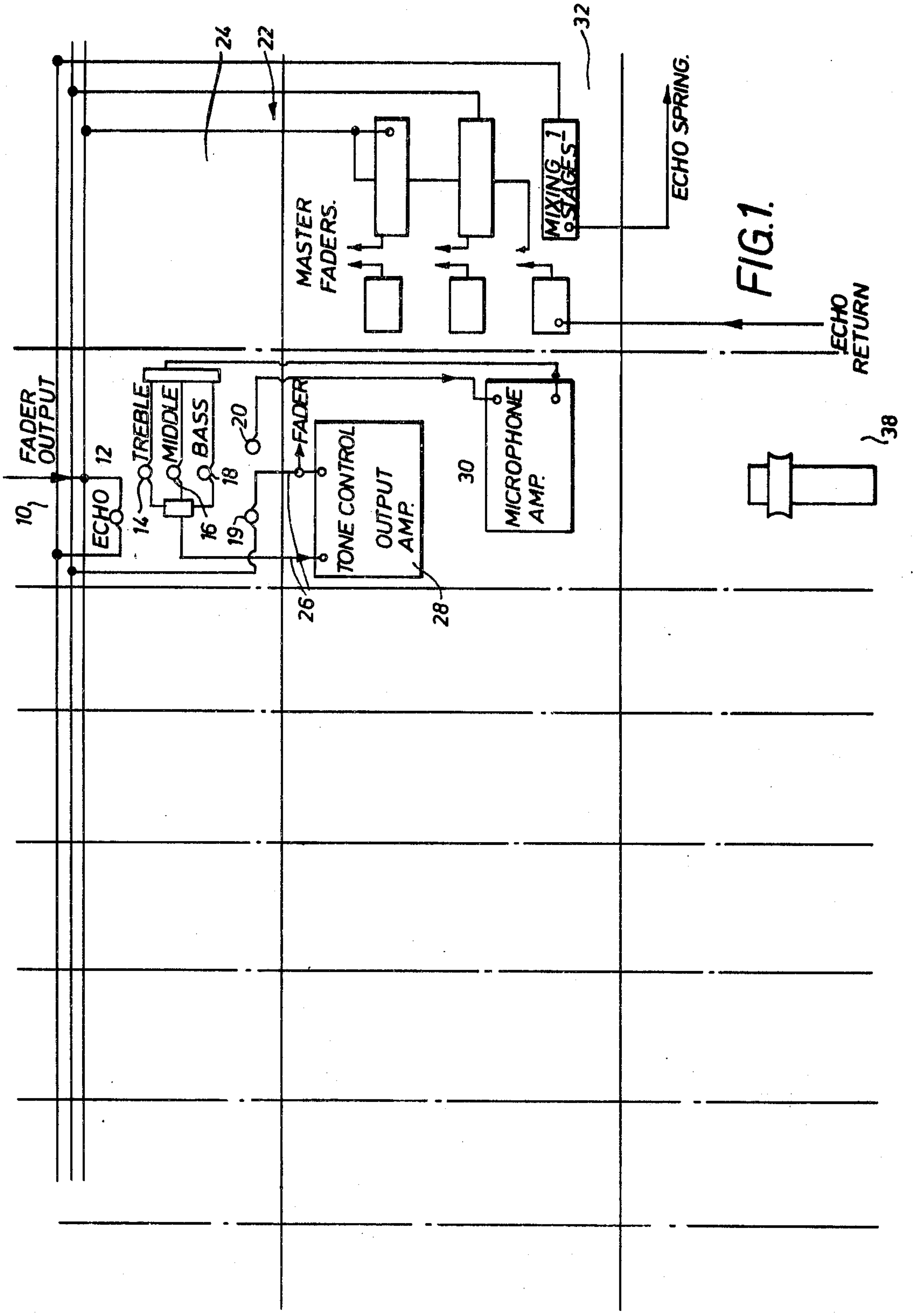
FIG. 1 is a schematic block circuit diagram of a multiple channel microphone mixing desk.
Figure 2:
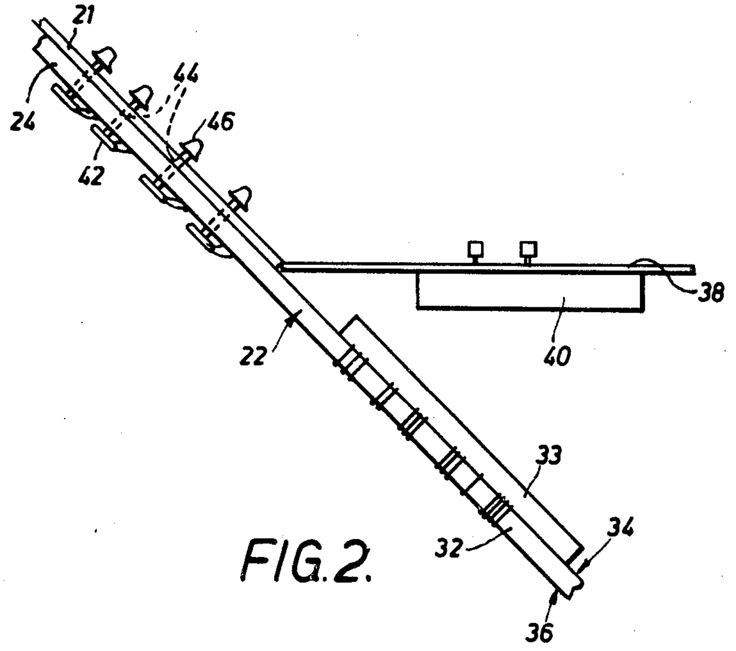
FIG. 2 is a schematic cross-sectional view of the control panel of a microphone mixing desk.

The circuit diagram of FIG. 1 shows one channel 10 of a six channel microphone mixing desk, the others being represented by the dot/dash lines and being identical circuits. A mixing desk may have any number of channels but commonly they include 6, 12 or 15 channels.

Each channel circuit includes six potentiometers 12, 14, 16, 18, 19 and 20 so that, in all, 36 potentiometers are required on the control panel 21. The channel circuits are mounted on a printed circuit board 22 which is larger in area than the control panel 21 and the potentiometers, which are disposed in an upper part 24 of the board 22 are connected by tracks 26 to a tone control 28 and a microphone input amplifier 30 disposed in a lower part 32 of the board 22.

The circuit components 33 comprising the tone control 28 and amplifier 30 are mounted on the opposite side 34 of the board 22 to the solder side 36. A fader panel 38 is mounted beneath the control panel 21 at an angle to the printed circuit board 22 so as to accommodate the circuit components 33 and the faders 40. It is convenient to mount the fader panel 38 at an angle to the control panel 21 since this facilitates operation of the mixing desk.

The control panel 21 is fixed to the printed circuit board 22 and each potentiometer is mounted with its body 42 adjacent the solder side 36 of the printed circuit board 22 and its operating shaft 44, on which is mounted a control knob 46, protruding from the control panel.

Figure 3:
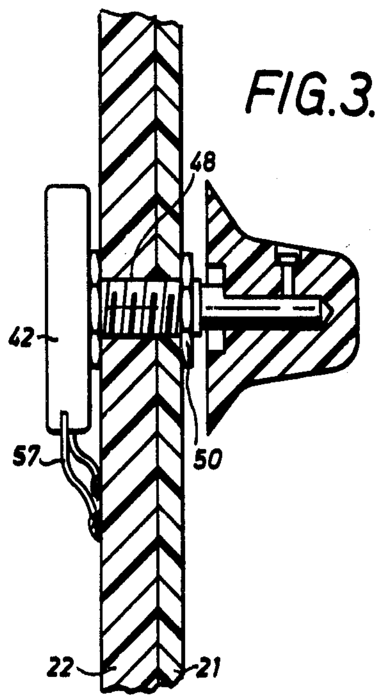
FIG. 3 is a view of a part of FIG. 2 on enlarged scale to show a potentiometer secured in position.

An enlarged view of one potentiometer is shown in FIG. 3 from which it can be seen that the screw threaded arm 48 extending from the body 42 passes through holes in the printed circuit board 22 and the control panel 21 and that the potentiometer is secured in this position by a nut 50 screwed onto the arm 48. Tags or terminals 52 on the body 42 are bent down and soldered to the solder-side 36 to form an electric connection with appropriate tracks on the printed circuit board.

Figure 4:
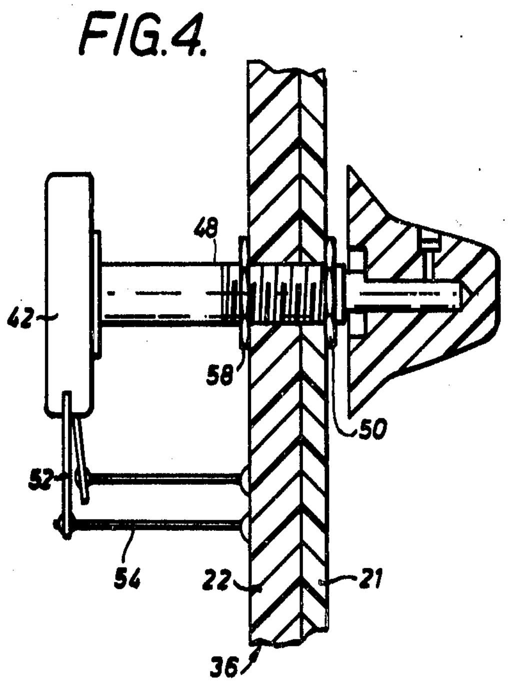
FIG. 4 is similar to FIG. 3 but shows a potentiometer secured in a different way.

The arm 48 in the embodiment of FIG. 4 is much longer than in FIG. 3 and in this embodiment the electrical connection is made by soldering a length of wire 54 between each tag or terminal 52 and the solder side 36 of the printed circuit board. The potentiometer is secured by two nuts 50 and 56 on the screw threaded arm 48.

To remove one potentiometer is a simple matter and involves merely the removal of the control knob 46 and nut 50 and disconnection of the soldered joints on the solder side 36 of the printed circuit board.

The lower part 32 of the printed circuit board 22 may be double-sided, that is each side may be a solder side. Alternatively the printed circuit board as a whole may be double-sided in which case an insulated layer is preferably provided between the upper part 24 of the printed circuit board 22 and the control panel 21.

What is claimed is:

1. Control apparatus comprising a control panel, an electrical circuit board adjacent the panel, a plurality of potentiometers each having a body from which extends an arm bearing at its free end means for operating the potentiometer and each electrically connected to a circuit on the circuit board on the solder side remote from the panel, a plurality of manual control knobs each removably attached to one of said operating means for operating the potentiometer from which that arm extends, and means for securing said potentiometers, panel and board together with said arms passing through both the circuit board and the control panel including removable fastener means between each of said knobs and said panel for holding said panel and board in firm contact.

2. Control apparatus according to claim 1, wherein the circuit board is larger in area than the control panel and wherein the control panel is attached to an upper part of the circuit board and wherein the control devices are electrically connected, by tracks on the circuit board, to circuit components mounted on a lower part of the said one side of the board.

* * * * *